United States Patent [19]

Gaeth et al.

[11] Patent Number: 5,049,770
[45] Date of Patent: Sep. 17, 1991

[54] ELECTRIC MOTOR-DRIVEN IMPELLER-TYPE AIR PUMP

[75] Inventors: Gerald A. Gaeth, Frankenmuth; Joseph P. Brigham, Flint; Russell L. Herlache, Saginaw, all of Mich.; Steven W. Sherrill, Athens, Ala.

[73] Assignee: General Motors Corporation, Detroit, Mich.

[21] Appl. No.: 503,596

[22] Filed: Mar. 26, 1990

[51] Int. Cl.⁵ .................. H02K 5/08; H02K 5/24; H02K 9/06; F04B 35/04
[52] U.S. Cl. .................................. 310/89; 310/43; 310/51; 310/58; 417/423.14
[58] Field of Search ............. 310/43, 89, 51, 62, 310/63; 417/423.1, 423.7, 423.9, 279, 423.14; 98/116; 55/417

[56] References Cited

U.S. PATENT DOCUMENTS

| | | | |
|---|---|---|---|
| 3,138,105 | 6/1964 | White | 417/423.1 |
| 3,220,349 | 11/1965 | White | 103/87 |
| 3,527,969 | 4/1985 | Papst | 310/43 |
| 4,130,374 | 12/1978 | Bingler | 417/423.1 |
| 4,557,185 | 12/1985 | Harriman | 98/116 |
| 4,659,951 | 4/1987 | Angi et al. | 310/62 |
| 4,722,674 | 2/1988 | Adams et al. | 417/423.15 |
| 4,756,233 | 7/1988 | Takahashi et al. | 55/417 |
| 4,777,395 | 10/1988 | Taylor et al. | 310/89 |
| 4,801,833 | 1/1989 | Dye | 310/43 |
| 4,845,396 | 7/1989 | Huber | 310/43 |
| 4,893,995 | 1/1990 | Hufstader | 417/370 |
| 4,897,023 | 1/1990 | Bingler | 310/89 |

FOREIGN PATENT DOCUMENTS

| | | | |
|---|---|---|---|
| 2739887 | 3/1979 | Fed. Rep. of Germany | 310/43 |
| 0581505 | 10/1946 | United Kingdom | 417/423.14 |

Primary Examiner—Steven L. Stephan
Assistant Examiner—Dennis R. Haszko
Attorney, Agent, or Firm—Karl F. Barr, Jr.

[57] ABSTRACT

An electrically operated air pump for supplying air to the exhaust system of an internal combustion engine having a central mounting plate which is integral with the electric motor assembly. The armature shaft of the electric motor drives an impeller within a working chamber defined by an impeller housing and one side of the mounting plate. A silencer housing encloses the motor assembly and contains an air circuit for channeling air to and from the working chamber of the pump. The air circuit contains a solenoid operated air valve for restriction of outlet air, and sound insulation means for external sound reduction. The central mounting plate, impeller, impeller housing, and silencer housing are constructed of a polymeric material which allows complex features to be molded into the part thereby minimizing machining and assembly complexity.

22 Claims, 6 Drawing Sheets

ELECTRIC MOTOR-DRIVEN IMPELLER-TYPE AIR PUMP

BACKGROUND OF THE INVENTION

1. Field of the Invention

The present invention relates to an electrically-operated air pump suitable for supplying air to the exhaust system of an internal combustion engine.

2. Description of the Relevant Art

Automotive engines often have an air pump for supply of air to the engine exhaust system. The air supports combustion of hydrocarbons and carbon monoxide in the exhaust system to minimize admission of those compounds into the atmosphere.

In the past, such air pumps generally have had a mechanical drive from the engine and accordingly consume engine power during all operating modes. In many applications, however, air is required to support combustion in the exhaust system only during the initial period of engine operation. Thus, in those instances, the air pump has undesirably consumed engine power after the initial period of engine warm-up and, at a time when supplemental air is not required.

Additionally, the traditional engine-driven air pumps require a rigid mounting scheme at the front of the engine which requires a relatively large amount of underhood space. As the space available within vehicle engine compartments is reduced, due to automobile size and styling concerns, it is desirable to reduce the number of engine mounted accessories.

SUMMARY OF THE INVENTION

This invention provides an electrically-operated air pump which is operable to supply air to an engine exhaust system only during those periods when air is required to support combustion therein. The air pump accordingly consumes power only when necessary. Additionally, the pump assembly contains the major components of the air circuit including an electric motor, a regenerative turbine air pump, an air shut-off valve, and an optional static filter.

More specifically, the air pump has a central mounting plate to one side of which is attached the components of an electric motor. An impeller housing is secured to the second side of the mounting plate and houses an impeller therein. The impeller is driven by the motor armature shaft which extends through a central aperture in the mounting plate. The mounting plate cooperates with an upper motor housing to enclose the motor, resulting in a significantly lower profile since the mounting plate is an integral part of the motor assembly.

To reduce the noise generated by the pump during operation, a silencer housing cooperates with the mounting plate to enclose the electric motor assembly. Within the silencer housing, a central motor chamber isolates the motor assembly. An air circuit extends coaxially about the motor chamber and has an inlet chamber for introducing air to the working chamber of the impeller housing, and an outlet chamber for channeling air leaving the working chamber of the impeller housing to the exterior of the pump.

To prevent engine siphoning of air during the closed loop operation (stoichiometric), and in cases of a rich air-fuel mixture within the exhaust system, it is undesirable to supply air from the pump due to the potential for interference with proper engine function and also due to the possibility of ignition and resulting backfire within the system. To reduce the likelihood of such conditions, an engine control module (ECM) controlled air valve is disposed within the air circuit to immediately restrict the air supply from the pump upon the determination of a fuel-rich environment within the exhaust system. Special circuitry is provided to prevent interference with valve operation caused by current generated during motor coastdown.

A feature of the present air pump is the fabrication of a substantial number of the components from polymeric materials allowing the inclusion of several unique features in the part castings. For instance, the central mounting plate has mounting means for the electric motor bearing, the electric motor brush-card assembly, and the electric motor upper housing integrally formed therein. Attachment of these devices through processes such as heat staking or ultrasonic welding eliminates the need for various separate attaching means.

The impeller, which has a central hub portion and an outer blade portion, has a series of elongated arcuate recesses formed within the hub portion. The air trapped within these recesses creates turbulence between the impeller hub and the opposing face of the impeller housing thereby reducing the leakage of air between the inlet and the outlet portions of the impeller working chamber.

Lock recesses are formed about the circumference of the mounting plate with lock ramps formed integrally therein. The lock ramps are configured to matingly engage corresponding lock arms which extend outwardly from the impeller housing. The arms engage in a bayonet fashion to hold the mounting plate and the impeller housing in engagement. Lock tabs which extend downwardly from the silencer housing extend through the lock recesses in an adjacent position to the impeller housing lock arms thereby restraining the lock arms from disengagement with the lock recesses. The lock tabs engage lock nubs which are formed on the exterior of the impeller housing and, as a result, the tabs act to restrain the impeller housing, the mounting plate, and the silencer housing from relative axial movement.

Finally, the use of polymeric material throughout the pump assembly, helps to eliminate corrosion caused by environmental conditions such as salt and moisture which is prevalent within the engine compartment of an automobile and, additionally, the elimination of galvanic corrosion which is of concern in commonly used air pumps.

Other objects and features of the invention will become apparent by reference to the following description and to the drawings.

DESCRIPTION OF THE PREFERRED EMBODIMENT

Figure 1:
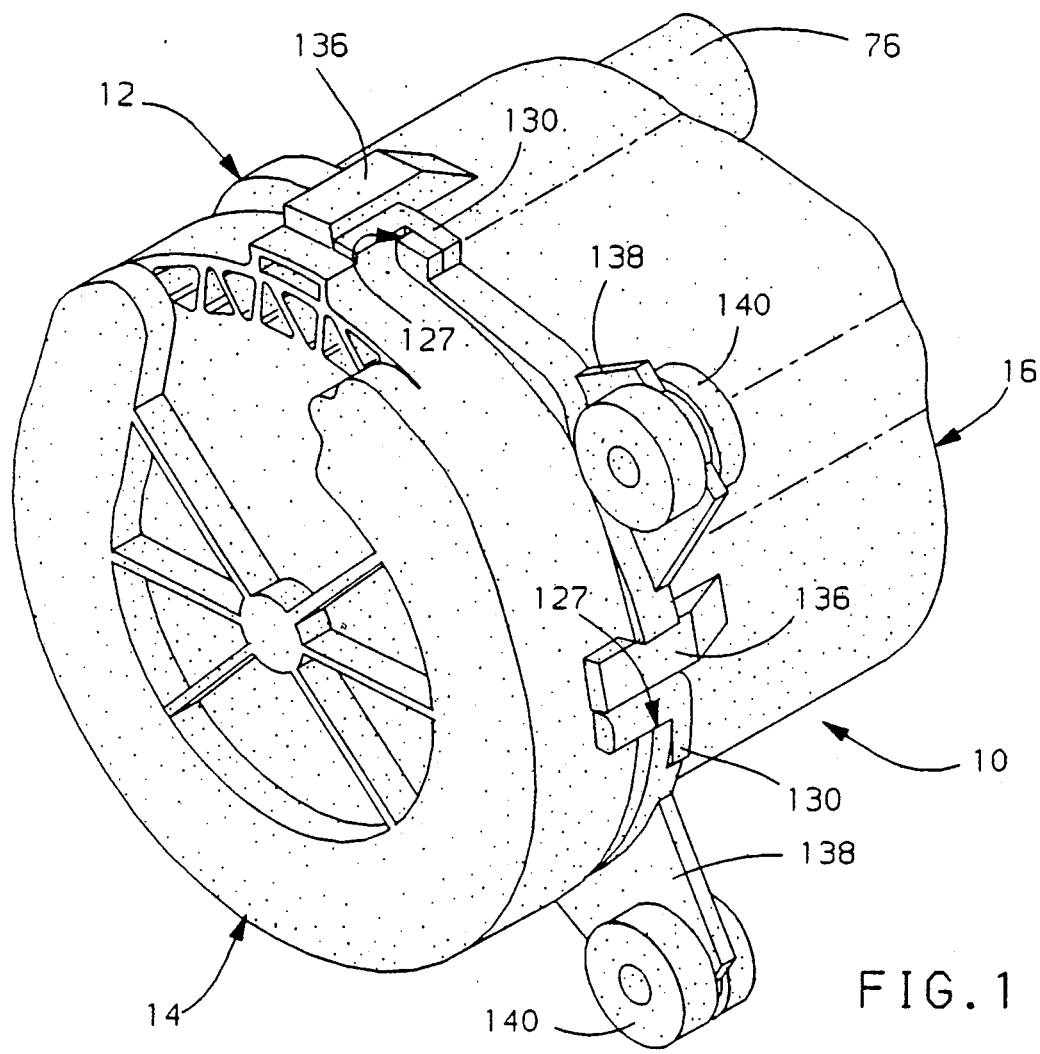
FIG. 1 is a perspective view of an electric motor-driven impeller-type air pump embodying the present invention.

In FIG. 1, there is shown an electric motor-driven impeller-type air pump, designated generally as 10, which is useful for supplying secondary air to the exhaust system of an internal combustion engine to reduce exhaust gas emissions. The air pump 10 has a mounting plate 12, an impeller housing 14, and a silencer housing 16. The three components combine to form the primary structure of the air pump 10, and are preferably constructed of a polymeric material such as polyphenylene sulfide, or other suitable material which provides the necessary durability and rigidity. Use of polymers in the construction of the pump allows the components to be cast with many integral features and complex shapes (described in further detail below) which are not easily achieved using metal casting. This allows a reduction in the number of sub-assemblies necessary and in the number of steps required to assembly a pump while achieving high part tolerances due the integration of several parts into one casting.

Figures 2, 3:
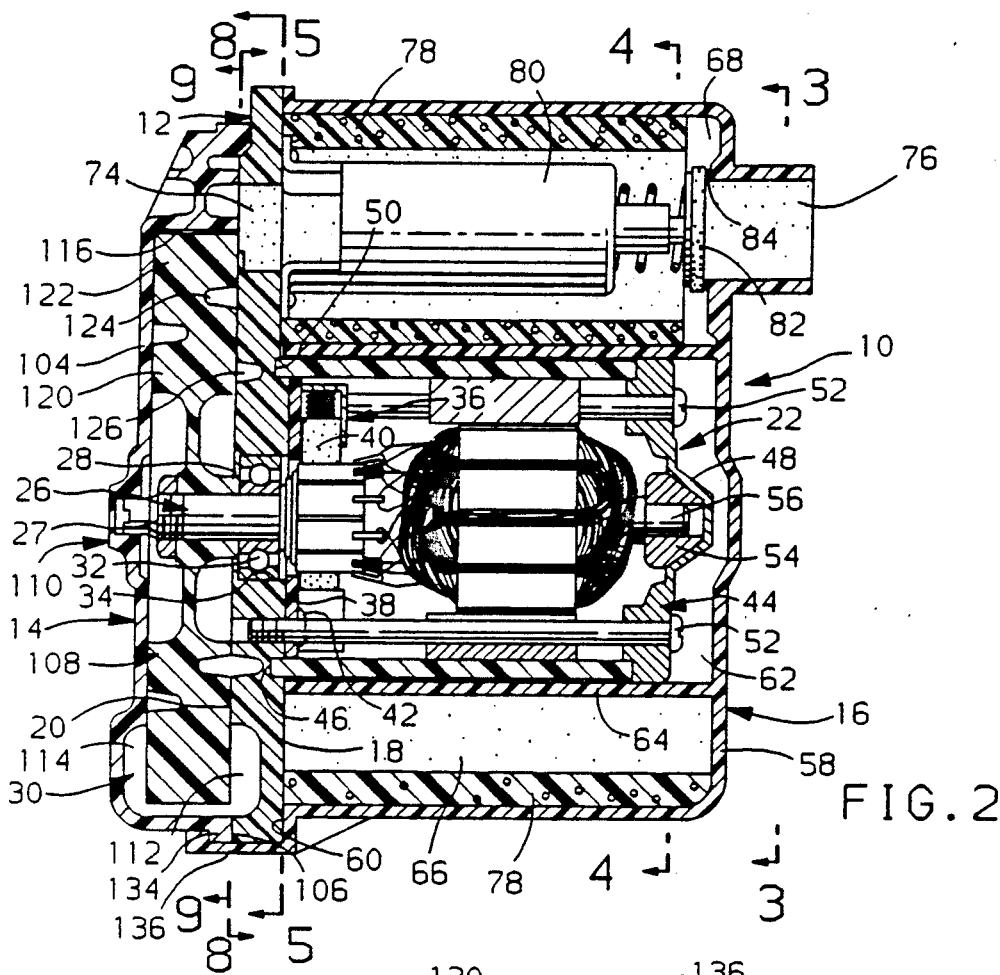
FIG. 2 is a side sectional view of the air pump of FIG. 1.
FIG. 3 is a view of the air pump taken along line 3—3 of FIG. 2.

As shown in FIG. 2, mounting plate 12 has a first, upper surface 18 and a second, lower surface 20. Integral with first, upper surface 18 is an electric motor assembly 22 which has an armature shaft, designated generally as 26, having a first end 27 that extends through a central mounting plate aperture 28 and into the working chamber 30 which is defined between the second, lower surface 20 of the mounting plate 12 and the impeller housing 14. To operatively support the armature shaft 26 at a location midway of its length, a motor bearing 32 is disposed within a bearing mounting recess 34 which is formed in first, upper surface 18 of the mounting plate 12. The bearing 32 is fixedly secured within mounting recess 34 by staking or ultrasonic welding.

Figure 5:
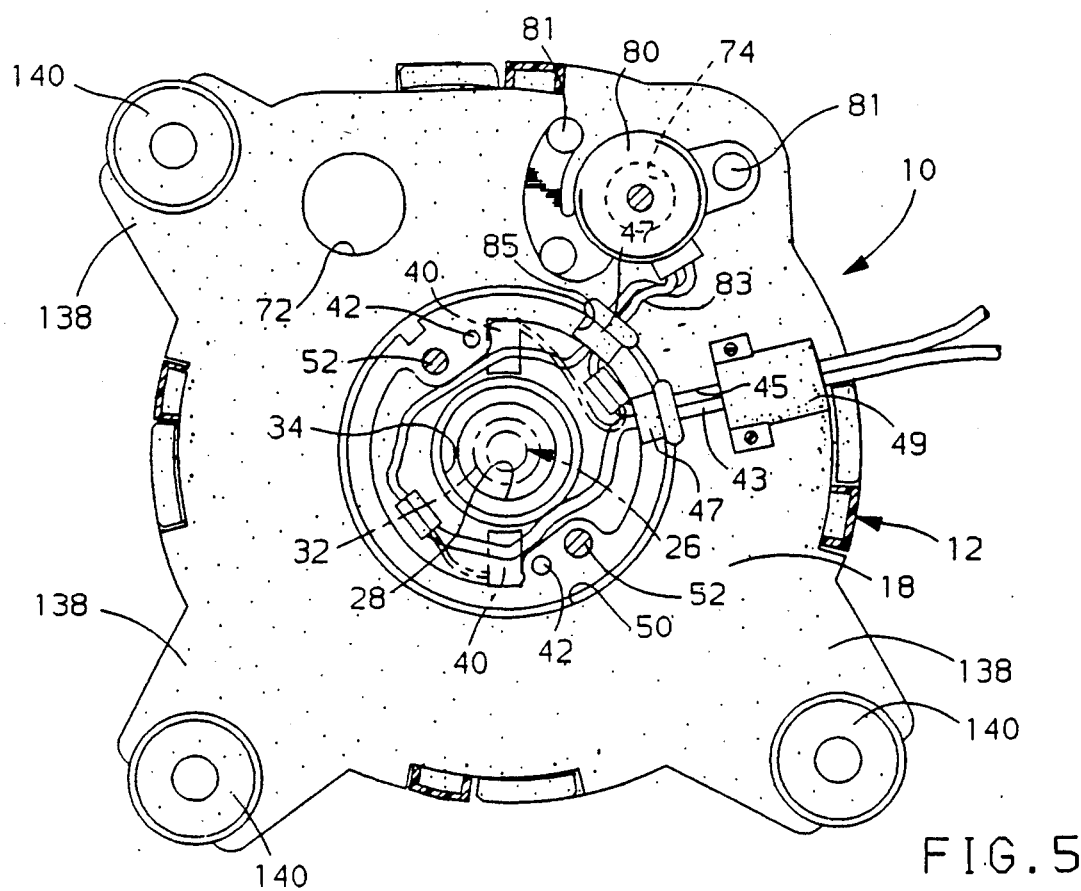
FIG. 5 sectional view of the air pump showing the mounting plate with certain features omitted, taken along line 5—5 of FIG. 2.

A motor brush assembly 36, which comprises a brush mounting plate, or card 38 to which brushes 40 are assembled, is mounted to the first, upper surface 18 of mounting plate 12, in an operative relationship to armature shaft 26. The brush assembly 36 matingly engages positioning stakes 42, see FIG. 5, which are formed in mounting plate 12 during construction of the plate. To secure the brush assembly 36 to the mounting plate 12 the assembly is staked, using the positioning stakes 42. This assembly method eliminates the need for separate fasteners which require assembly time and add weight to the overall pump. Electrical requirements for the motor brush assembly are served by a wiring harness 43 which is routed from the electric motor assembly 22 to the exterior of the air pump 10 through wiring channel 45 which is also pre-cast in the mounting plate 12. Grommets 47 and 49, required to seal openings in the plate 12 and silencer housing 16 for the passage of the wiring harness, positively seat in their respective openings for ease of assembly.

To enclose the motor bearing 32, the armature shaft 26, and the brush assembly 36, a motor upper housing 44, having a first open end 46 and a second closed end 48, extends over these parts with its first opened end 46 engaging groove 50 formed in first, upper surface 18 of mounting plate 12 to cooperate with mounting plate 12 to enclose the motor. The upper housing 44 is fixedly attached to mounting plate 12 using ultrasonic welding or attaching means such as bolts 52 which engage threaded holes in upper surface 18. Within second closed end 48 of motor upper housing 44 is a second bearing member 54 which acts to support the second end 56 of armature shaft 26.

It should be noted that the mounting plate 12 forms an integral part of the electric motor assembly 22 by mounting the motor bearing 32 and motor brush assembly 36 therein, and in cooperating with the motor upper housing 44 to enclose the motor components. The result of the integration of the motor and the mounting plate is a substantial reduction in overall pump size when compared to a pump having these components as separate assemblies. Additionally, alignment difficulties between the motor and the pump structure are substantially reduced due to the incorporation of the motor assembly 22 and the mounting plate 12 into one integral component.

Figure 4:
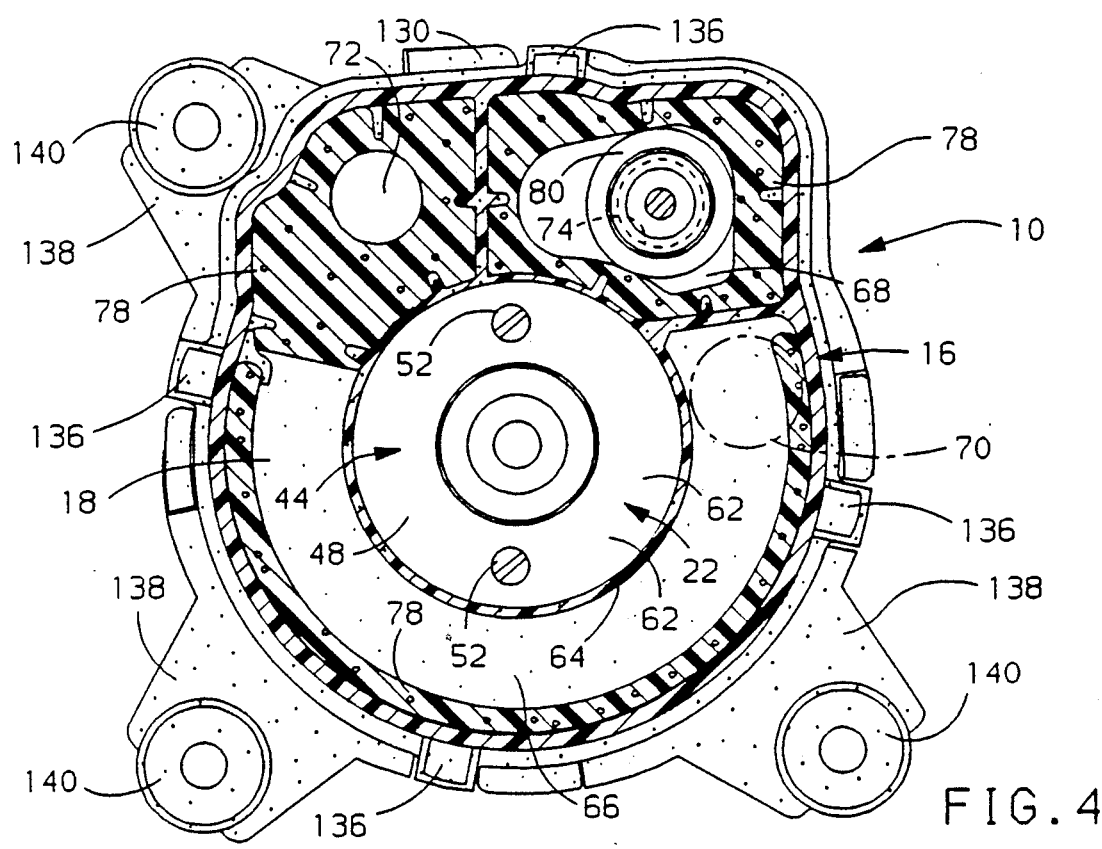
FIG. 4 sectional view of the air pump taken along line 4—4 of FIG. 2.

As shown in FIGS. 2 through 4, silencer housing 16 comprises a first closed end 58 and a second open end 60. The housing extends over the electric motor assembly 22, and cooperates with attaching means (described below) disposed on mounting plate 12 to enclose the motor assembly. Within the interior of the silencer housing 16 a central motor chamber 62 is formed by chamber walls 64 to isolate the motor assembly 22 within the silencer housing. Disposed coaxially about central motor chamber 62 is an air circuit comprising an air inlet chamber 66 and an air outlet chamber 68 which is separated from the inlet chamber. The inlet chamber 66 communicates with an inlet port 70, formed in the closed end 58 of silencer housing 16, and with inlet opening 72 of working chamber 30 formed in mounting plate 12. Similarly, air outlet chamber 68 interconnects outlet opening 74, see FIG. 2, of working chamber 30, formed in mounting plate 12, with outlet port 76, formed in the closed end 58 of silencer housing 16. During operation, air is drawn into air pump 10 through inlet port 70 where it passes through air inlet chamber 66 and into working chamber 30 via inlet opening 72. The air exits working chamber 30 through outlet 74, where it passes through outlet chamber 68 to exit the pump at outlet port 76. The configuration of the silencer housing, with the inlet and outlet ports placed on the closed end 58 of the housing 16 achieves substantial benefits over configurations where air is inlet on one side of the pump and is outlet on a different side of the pump. Specifically, the placement of the pump within the automobile requires less space since hoses carrying inlet and outlet air approach from the same direction.

Disposed within inlet and outlet chambers 66, 68 of silencer housing 16 is sound insulation 78. The insulation is placed to have a maximum effect on noise while minimizing interference with air flow through the air circuit. The sound insulation 78 may comprise an open cell foam material or other suitable material which achieves desired sound reduction while allowing air to pass therethrough.

To prevent engine siphoning of air during closed loop engine operation (stoichiometric), and during instances of rich fuel/air mixture, it is undesirable to supply oxygen-rich air to the exhaust system. When such a condition is identified, it is desirable to shut off the flow of air from the pump instantaneously. To achieve this goal, an air valve is disposed within the air circuit to block the flow of air. In a preferred embodiment, the air valve comprises a solenoid 80 which is mounted within the air outlet chamber 68 of the silencer housing 16. The solenoid 80 mounts to mounting plate 12 using fasteners 81 such as screws which engage threaded holes in the plate, or it may be positioned using stakes which are molded into the plate 12 and subsequently staked in place. The normally closed solenoid 80 operates a valve member 82 which is maintained in an opened position, to allow air flow, during motor operation. When air flow is not required, solenoid 80 is de-energized allowing valve member 82 to move to a closed position, shown in FIG. 2, where it seats against valve seat 84 which is integral with, and extends about the interior perimeter of the outlet port 76 of the silencer housing 16. Although other locations within the air circuit are suitable, the location within the outlet chamber 68 is preferred since leakage paths are eliminated, thereby reducing the need for complex seals between the housing members 14, 16 and the mounting plate 12.

Figure 1A:
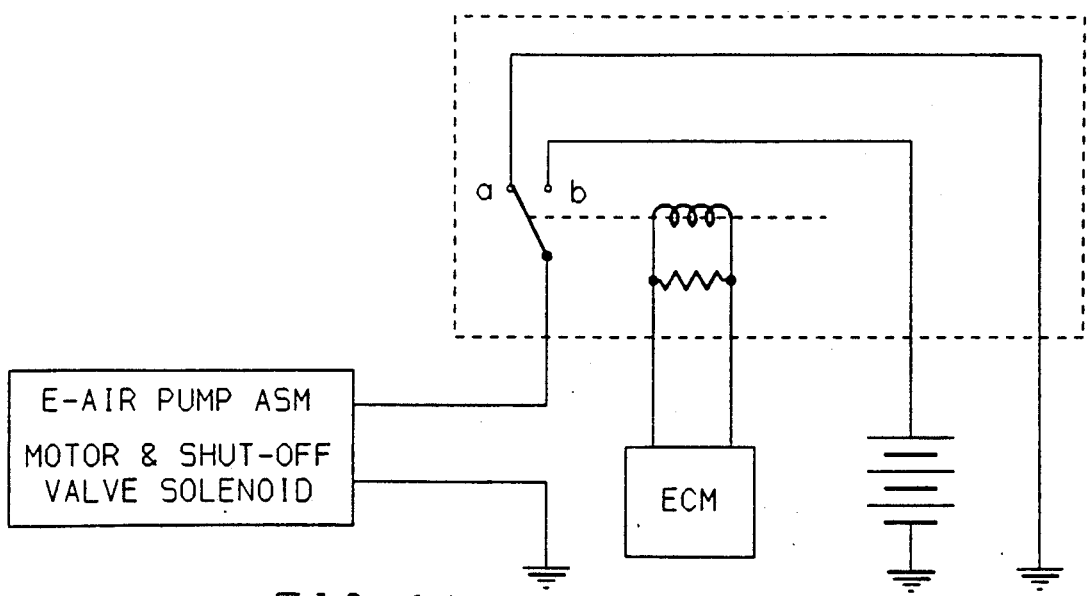
FIG. 1a is a schematic diagram of the motor/solenoid circuit of the present invention.

The motor 22 and the solenoid 80 are wired in parallel so that when the motor is de-energized, the solenoid valve simultaneously returns to its normally closed position to block air flow. In order that the solenoid 80 is not affected by electrical EMF back flow and coastdown current generated by the motor, thereby delaying closure of the valve member 82, the electrical circuit shown in FIG. 1a is utilized. The circuit uses a device such as a double throw relay, controlled by the engine command module (ECM), or other controller, to simultaneously ground both the motor and the solenoid in the off position when secondary air is not desirable and power to motor 22 is turned off.

As with the motor assembly 22, the wiring harness 83 for the solenoid is disposed within an integral channel 85 in the mounting plate. The wiring harness, upon exiting the silencer housing, terminates in a standard electrical fitting 86 which is mounted to the side of silencer housing 16, as shown in FIG. 3.

Figure 13:
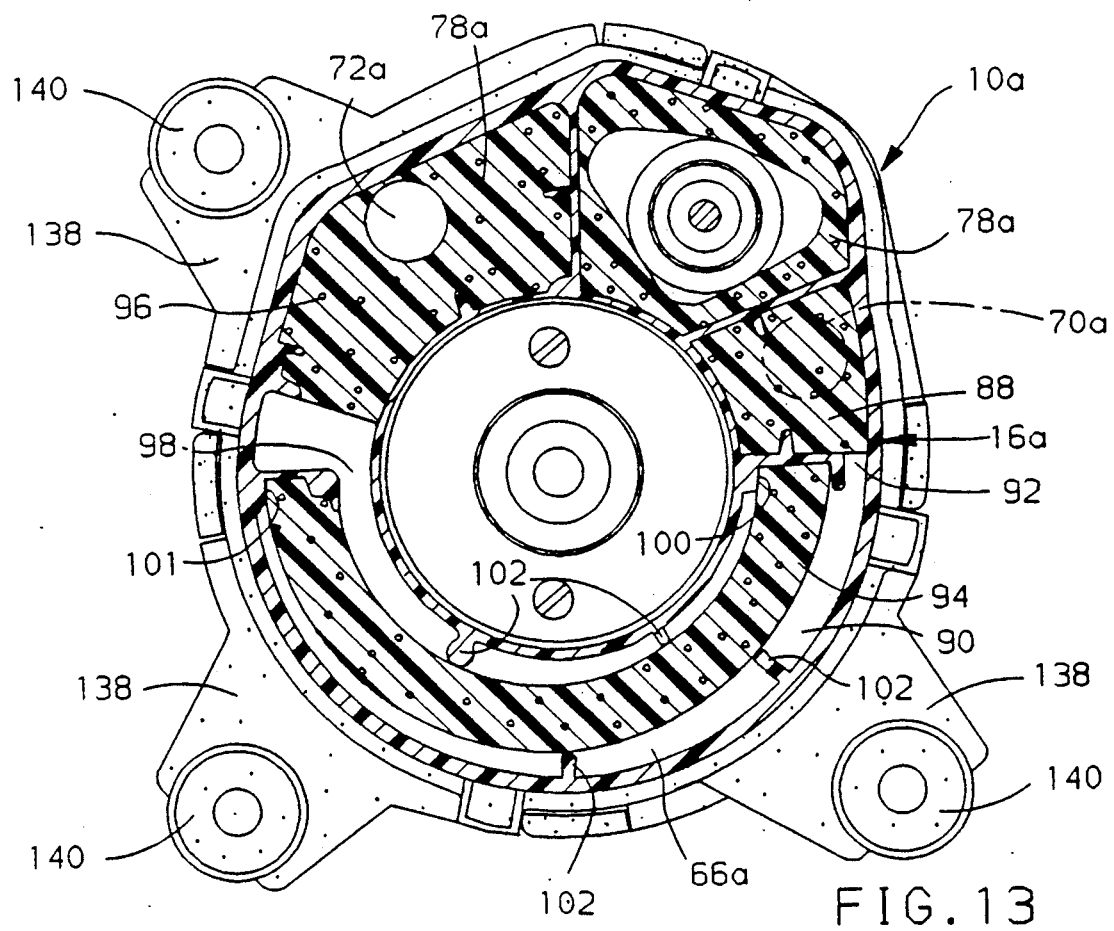
FIG. 13 is a sectional view of a second embodiment of the air pump of the present invention, similar to FIG. 4.

The air pump assembly described thus far assumes that intake air is drawn from a filtered source such as the engine air cleaner. An alternative embodiment is shown in FIG. 13 for applications where filtered air is not available or where an extra degree of filtration is desirable. In FIG. 13 similar numerals followed by an "a" suffix denote similar parts described above. In the embodiment of FIG. 13, the air inlet chamber 66a of silencer housing 16a is subdivided into a first, inlet port chamber 88 which is integral with the silencer housing inlet port 70a, a second, filter chamber 90 which is interconnected with inlet port chamber 88 by passage 92 and contains a filter element 94, and a third, induction port chamber 96 which is interconnected with filter chamber 90 by passage 98 for conducting filtered air from the filter chamber to the impeller chamber inlet 72a. The filter element 94 is of a semi-rigid configuration and mounts within filter chamber 90 supported by channels 100, 101 and supporting members 102. As such, the filter element is configured to induce radial flow therethrough to minimize restriction and increase filtering efficiency. As with the first embodiment, described above, sound insulation 78a is disposed at locations throughout the air circuit to reduce noise from the air pump 10a while allowing air to pass therethrough.

Figure 9:
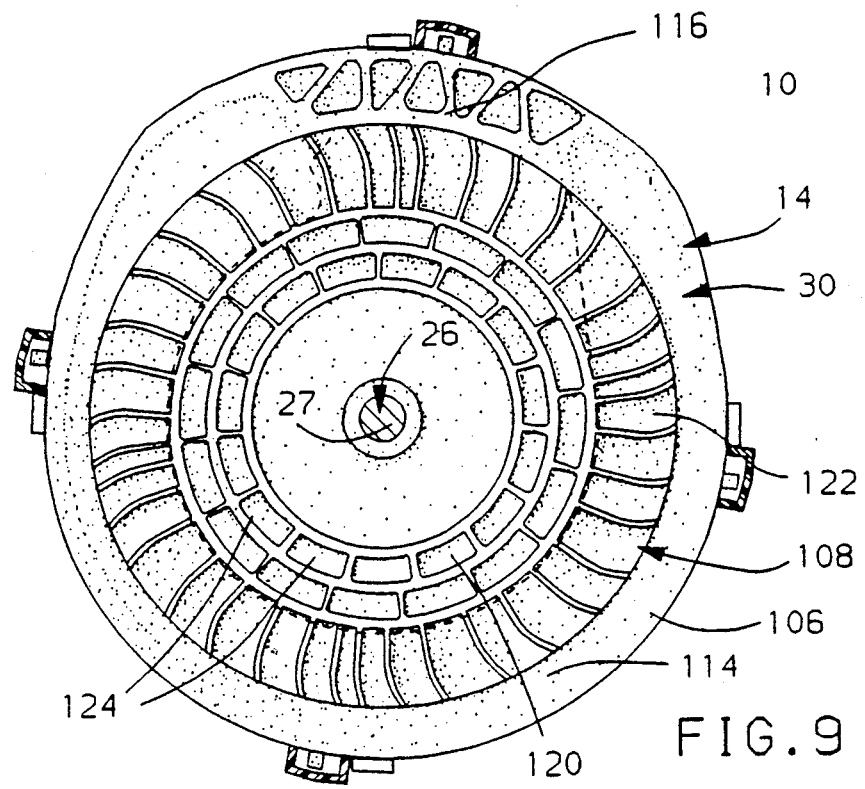
FIG. 9 is a sectional view of the air pump taken along line 9—9 of FIG. 2.

As described above, the impeller housing 14, having a first closed end 104 and a second open end 106, engages the second, lower surface 20 of mounting plate 12 to form working chamber 30. The first end portion 27 of armature shaft 26 extends through mounting plate 12 and into the working chamber 30 where it supports a regenerative-type impeller 108, see FIG. 9. The upper portion 112 of working chamber 30 is formed in the lower surface 20 of mounting plate 12. This part of the chamber includes the inlet and outlet openings 72 and 74 which connect the working chamber 30 to the air circuit of the silencer housing 16. The lower portion 114 of the working chamber 30 is formed in the impeller housing. As with the mounting plate 12 and the silencer housing 16, the impeller housing 14 and the impeller 108 are constructed of polymer materials. This allows the forming of complex shapes within the parts without the need for machining and balancing which would be required in the case of metallic components. An example is the molding of the stripper 116 into the lower working chamber 114 of the impeller housing 14. The stripper 116 separates the intake side of the pump from the outlet side of the pump and requires a close tolerance fit relative to the impeller 108 to achieve a high degree of pump efficiency.

Figure 6:
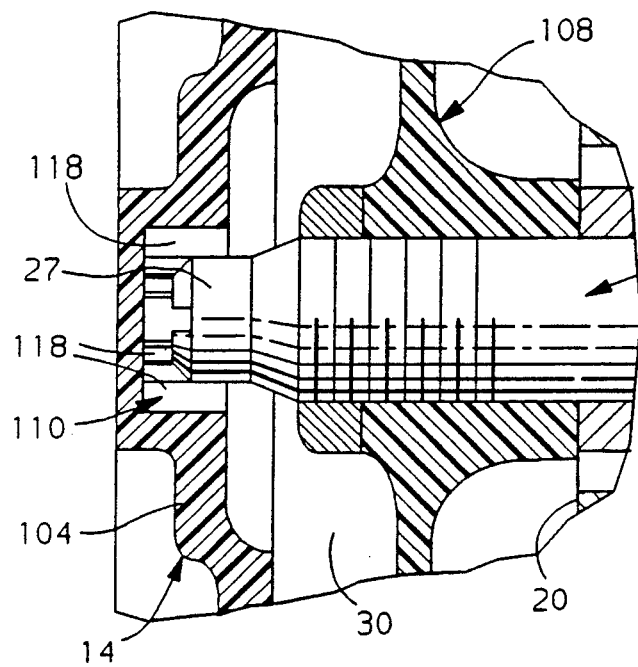
FIG. 6 a partial sectional view of the impeller housing of the present invention.
Figure 7:
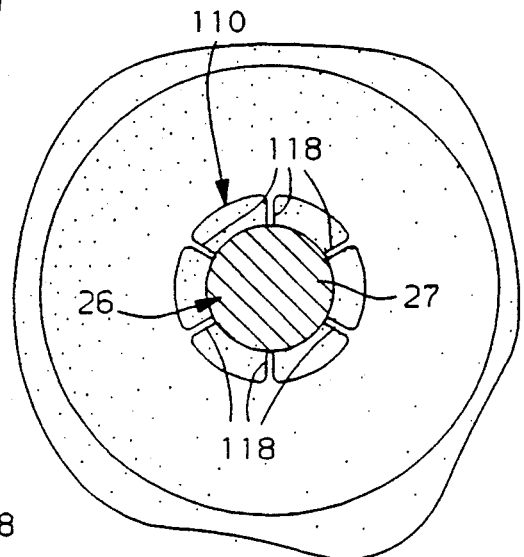
FIG. 7 a partial end view of the armature shaft pilot embodied in the present invention.

To achieve the close tolerance fit required between the impeller 108 and the stripper 116, the first end 27 of armature shaft 26 is positioned within the working chamber 30 by pilot 110, see FIGS. 6 and 7. Pilot 110 is cast into impeller housing 14, along with the stripper 116, thereby assuring a high degree of relative positional accuracy. The pilot 110 comprises radially inwardly extending webs 118 whose end portions cooperate to form a supporting bearing surface for the end portion 27 of armature shaft 26. Since the web portions 118 are molded from the polymer material used to mold the impeller housing 14, the webs are subject to wear in the case of misalignment between the armature shaft and the pilot. As a result the pilot 110 is inherently self-seating which eliminates stress on the motor caused by misalignment between the armature shaft 26 and the impeller housing 14.

The impeller 108 has a central hub portion 120 and an outer blade portion 122. The blade portion 122 has a series of radially outwardly extending curved blades which are disposed in a variably spaced configuration. The variable spacing reduces noise generated by the impeller during operation. For greatest efficiency it is desirable to prevent leakage from the inlet to the outlet side of working chamber 30 across the hub portion 120. In order to prevent leakage, a series of elongated arcuate recesses 124 are formed in the central hub portion 120 of the impeller 108. As the impeller rotates, relative to the chamber wall, air trapped within the recesses 124 creates a dynamic air seal between the surfaces of the impeller 108 and the working chamber 30 which acts to reduce leakage between the inlet and the outlet side of the working chamber 30.

Figure 8:
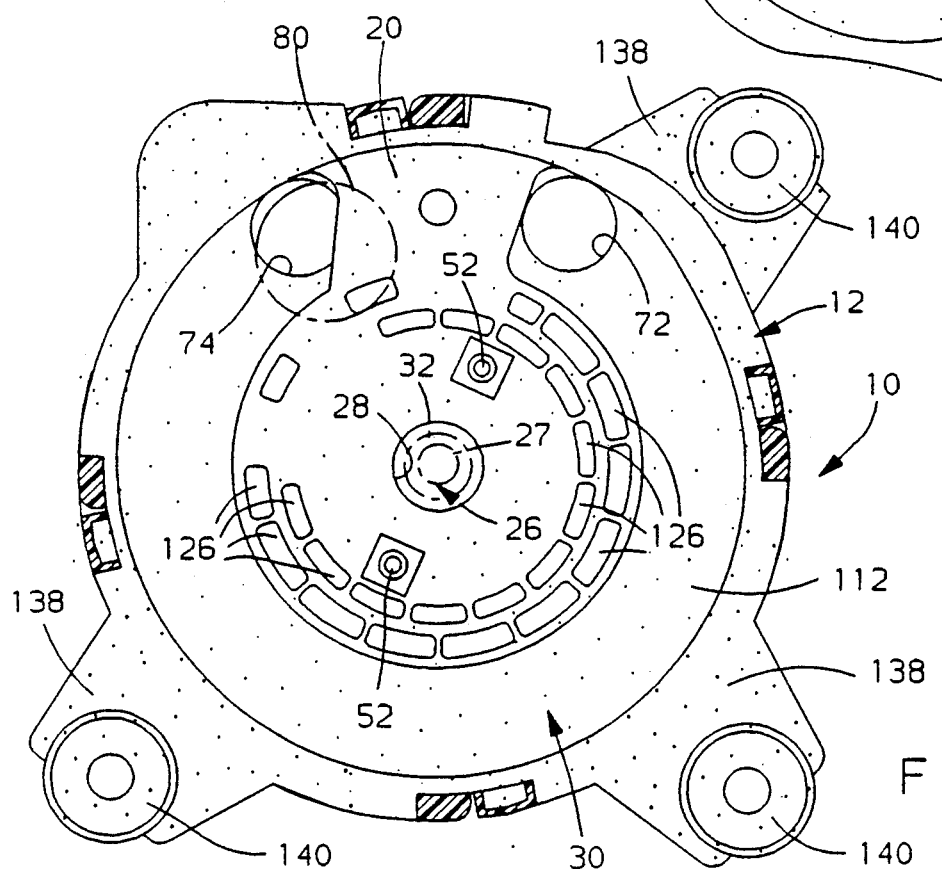
FIG. 8 is a sectional view of the air pump taken along line 8—8 of FIG. 2.

To further increase the sealing action of the impeller recesses 124, similarly shaped elongated arcuate recesses 126, may be formed in the opposing walls of the working chamber 30, as shown in FIG. 8. In the present embodiment the recesses are only shown in the lower surface 20 of the mounting plate 12, however, it is contemplated that the recesses may also be placed in the opposing surface of the impeller housing 14 if desired.

Figure 10:
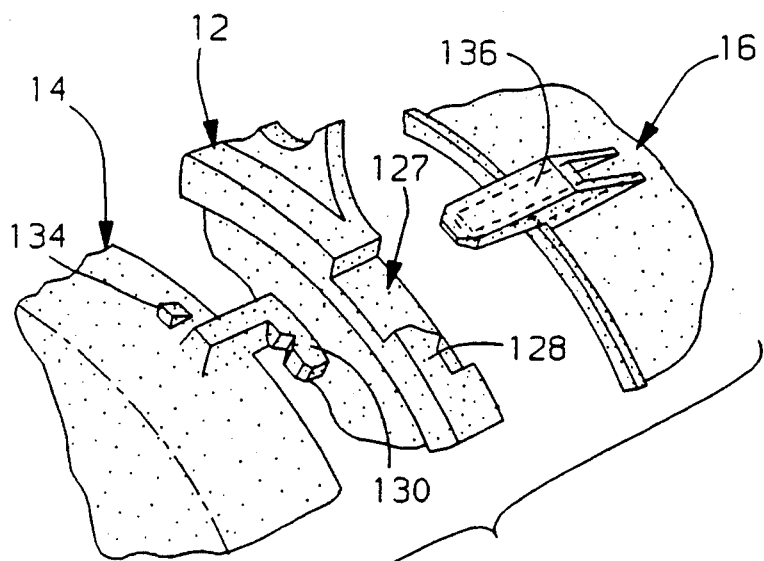
FIG. 10, 11, and 12 show the assembly sequence of the lock mechanism of the present invention.
Figure 11:
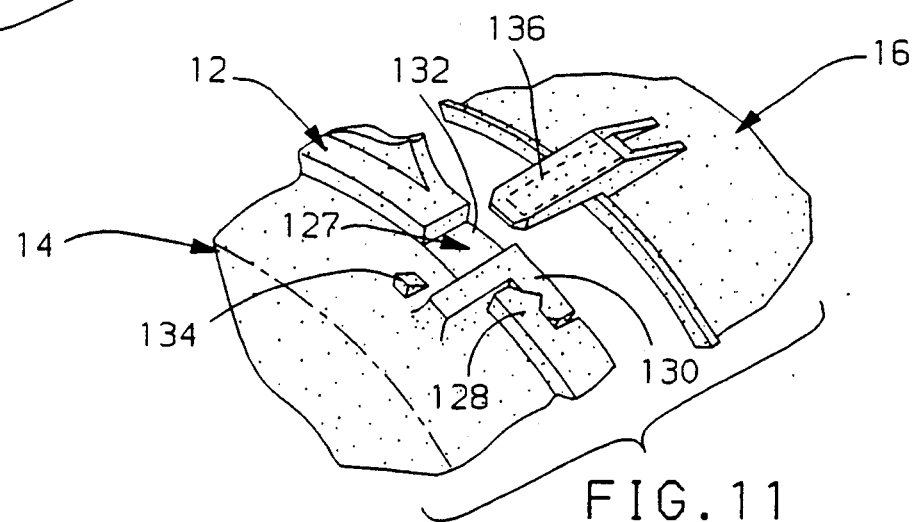
Figure 12:
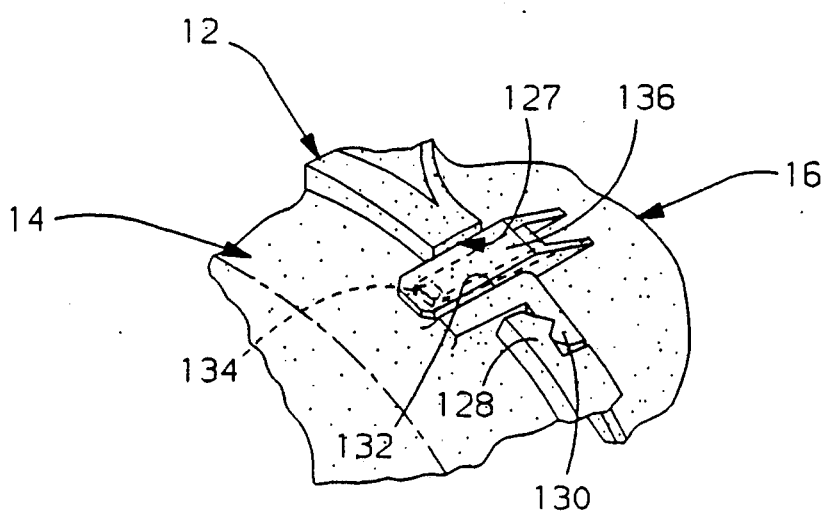

The use of polymeric materials in the construction of the silencer housing 16, and the impeller housing 14 allows for the use of a unique assembly system, shown in FIGS. 10 through 12. Mounting plate 12 has a series of lock recesses 127 formed about the circumference, each having a lock ramp 128 formed integrally therein. Lock arms 130, corresponding in number and location to the lock recesses 127 and their corresponding lock ramps 128 formed in mounting plate 12, extend outwardly from impeller housing 14. The lock arms 130 are configured to slidingly and rotatingly engage, in a bayonet fashion, the lock ramps 128 thereby retaining the mounting plate 12 and the impeller housing 14 in a fixed relative position. Once the impeller housing 14 is engaged with mounting plate 12, spaces 132 are formed adjacent to lock arms 130. Lock nibs 134, which extend outwardly from the side of the impeller housing, are positioned axially from the recess spaces 132, and are configured to engage locking tabs 136 which extend axially outwardly from the silencer housing 16 and correspond in number and location to the lock nibs 134. Tabs 136 each have a recess formed therein to engage the locking nibs 134 thereby restraining the mounting plate and impeller housing assembly from axial movement relative to silencer housing 16. As shown in FIG. 12, when engaged with nibs 134, tabs 136 lie adjacent to lock arms 130 to prevent the arms from disengaging from lock ramp 128 of lock recess 127. It should be noted that while in the present embodiment the lock arms 130 extend from the impeller housing and the lock tabs 136 extend from the silencer housing, the placement of these features could easily be modified.

Finally, mounting brackets 138 extend radially outwardly from mounting plate 12. The brackets 138 are configured to retain rubber vibration dampers 140 therein, for mounting electric air pump 10 in its desired application.

While certain embodiments of the invention have been described in detail above in relation to an electrically-operated air pump, it would be apparent to those skilled in the art that the disclosed embodiment may be modified. Therefore, the foregoing description is to be considered exemplary, rather than limiting, and the true scope of the invention is that described in the following claims.

The embodiments of the invention in which an exclusive property or privilege is claimed are defined as follows:

1. An electric air pump, having a central mounting plate, an electric motor assembly integral with a first side of said plate, and an impeller housing secured to a second side of said plate, said motor assembly having an armature shaft that extends, through a central aperture in said mounting plate, into the working chamber defined between said mounting plate and said impeller housing, to support and drive an impeller within said chamber to induce air flow through said chamber, from an inlet to an outlet, said air pump further comprising:
    bearing mounting means integral with said first side of said mounting plate and coaxial with said central aperture having an armature shaft bearing positioned therein, and brush mounting means positioned relative to said central aperture having a brush assembly attached thereto, said motor armature shaft centrally supported by said armature shaft bearing in an operational relationship with said brush assembly;
    a motor upper housing extending over said motor armature shaft and said brush assembly, and cooperating with said first side of said motor plate to enclose said motor;
    a silencer housing enclosing said electric motor assembly having a first closed end, and a second open end which cooperates with said first side of said mounting plate to enclose said motor assembly, a central motor chamber axially extending from said first end to said second end to isolate said motor assembly within said silencer housing, an air circuit disposed radially outwardly and coaxially of said central motor chamber having an air inlet chamber and an air outlet chamber, said outlet chamber isolated from said inlet chamber, a silencer housing inlet port, interconnected to said inlet chamber for introduction of air into said silencer housing, and a silencer housing outlet port, interconnected to said outlet chamber for passage of air out of said silencer housing;
    an impeller chamber inlet, extending through said mounting plate, for introducing air from said inlet chamber to the inlet side of said impeller chamber;
    an impeller chamber outlet, extending through said mounting plate, for exhausting air from the outlet side of said impeller chamber to said outlet chamber; and
    sound insulating means, disposed in said inlet and said outlet chambers.

2. An electric air pump, as defined in claim 1, further comprising:
    a valve disposed within said air circuit for restricting air flow from said air pump.

3. An electric air pump, as defined in claim 2, further comprising:
    a valve seat integral with the interior of said silencer housing and extending about the perimeter of said silencer housing outlet port;
    said air valve comprising a solenoid, disposed within said air outlet chamber, which operates a valve member to engage said valve seat.

4. An electric air pump, as defined in claim 3, further comprising:
    an electric circuit for controlling said motor assembly and said solenoid, in which said motor and said solenoid may be simultaneously grounded to prevent current, generated during motor coastdown, from delaying valve closure.

5. An electric air pump, having a central mounting plate, an electric motor assembly integral with a first side of said plate, and an impeller housing secured to a second side of said plate, said motor assembly having an armature shaft that extends, through a central aperture in said mounting plate, into the working chamber defined between said mounting plate and said impeller housing, to support and drive an impeller within said chamber to induce air flow through said chamber, from an inlet to an outlet, said air pump further comprising:
    bearing mounting means integral with said first side of said mounting plate and coaxial with said central aperture having an armature shaft bearing positioned therein, and brush mounting means positioned relative to said central aperture having a brush assembly attached thereto, said motor armature shaft centrally supported by said armature shaft bearing in an operational relationship with said brush assembly;

a motor upper housing extending over said motor armature shaft and said brush assembly, and cooperating with said first side of said motor plate to enclose said motor;

wherein said impeller housing is constructed of a polymeric material having a portion of said impeller chamber formed integrally therein and having a pilot aperture molded therein for supporting the impeller end of said motor armature shaft to thereby position said shaft and said impeller relative to said impeller chamber.

6. An electric air pump, as defined in claim 5, wherein said pilot aperture comprises radially inwardly extending webs whose end portions cooperate to form a supporting bearing surface for said armature shaft, said surface subject to wear in cases of misalignment between said armature shaft and said impeller housing thereby providing for a self-seating bearing surface.

7. An electric air pump, having a central mounting plate, an electric motor assembly integral with a first side of said plate, and an impeller housing secured to a second side of said plate, said motor assembly having an armature shaft that extends, through a central aperture in said mounting plate, into the working chamber defined between said mounting plate and said impeller housing, to support and drive an impeller within said chamber to induce air flow through said chamber, from an inlet to an outlet, said air pump further comprising:

bearing mounting means integral with said first side of said mounting plate and coaxial with said central aperture having an armature shaft bearing positioned therein, and brush mounting means positioned relative to said central aperture having a brush assembly attached thereto, said motor armature shaft centrally supported by said armature shaft bearing in an operational relationship with said brush assembly;

a motor upper housing extending over said motor armature shaft and said brush assembly, and cooperating with said first side of said motor plate to enclose said motor;

said central mounting plate constructed of a polymeric material having a portion of said impeller chamber formed integrally within said second side of said plate.

8. An electric air pump, as defined in claim 1, wherein said silencer housing air inlet chamber comprises a first inlet port chamber, integral with said silencer housing inlet port and having sound insulating means disposed therein, a filter chamber, interconnected with said first inlet chamber and having a filter element disposed therein and oriented, with respect to the air flow, so as to induce radial flow through said element, and an induction port chamber, interconnected with said filter chamber and said impeller chamber inlet and having sound insulating means disposed therein.

9. An electric air pump, as defined in claim 1, wherein said silencer housing inlet and outlet ports are located on said first closed end of said housing.

10. An electric air pump, having a central mounting plate, an electric motor assembly integral with a first side of said plate, and an impeller housing secured to a second side of said plate, said motor assembly having an armature shaft that extends, through a central aperture in said mounting plate, into the working chamber defined between said mounting plate and said impeller housing, to support and drive an impeller within said chamber to induce air flow through said chamber, from an inlet to an outlet, said air pump further comprising:

bearing mounting means integral with said first side of said mounting plate and coaxial with said central aperture having an armature shaft bearing positioned therein, and brush mounting means positioned relative to said central aperture having a brush assembly attached thereto, said motor armature shaft centrally supported by said armature shaft bearing in an operational relationship with said brush assembly;

a motor upper housing extending over said motor armature shaft and said brush assembly, and cooperating with said first side of said motor plate to enclose said motor;

said impeller comprising a central hub portion and an outer blade portion, said central hub portion having a series of elongated arcuate recesses formed therein;

wherein the air trapped within said recesses forms a dynamic air seal between said central hub portion and the opposing wall of said working chamber as said impeller hub rotates relative to said chamber, thereby reducing air leakage between the inlet and the outlet side of said working chamber.

11. An electric air pump, as defined in claim 10, wherein said opposing wall of said working chamber has similarly shaped opposing recesses which act in concert with said recesses in said impeller hub to form a dynamic air seal between said surfaces.

12. An electric air pump, having a central mounting plate, an electric motor assembly integral with a first side of said plate, and an impeller housing secured to a second side of said plate, said motor assembly having an armature shaft that extends, through a central aperture in said mounting plate, into the working chamber defined between said mounting plate and said impeller housing, to support and drive an impeller within said chamber to induce air flow through said chamber, a silencer housing enclosing said electric motor assembly having a first closed end, and a second open end which cooperates with said first side of said mounting plate to enclose said motor assembly, a central motor chamber axially extending from said first end to said second end to isolate said motor assembly within said silencer housing, an air circuit disposed radially outwardly and coaxially of said central motor chamber having an air inlet chamber and an air outlet chamber, said outlet chamber isolated from said inlet chamber, a silencer housing inlet port, interconnected to said inlet chamber for introduction of air into said silencer housing, and a silencer housing outlet port, interconnected to said outlet chamber for passage of air out of said silencer housing;

an impeller chamber inlet, extending through said mounting plate, for introducing air from said inlet chamber to the inlet side of said impeller chamber;

an impeller chamber outlet, extending through said mounting plate, for exhausting air from the outlet side of said impeller chamber to said outlet chamber; and sound insulating means, disposed in said inlet and said outlet chambers.

13. An electric air pump, as defined in claim 12, further comprising:

a valve disposed within said air circuit to restrict air flow from said air pump.

14. An electric air pump, as defined in claim 13, further comprising:
a valve seat integral with the interior of said silencer housing and extending about the perimeter of said silencer housing port;
said air valve comprising a solenoid, disposed within said air outlet chamber, having a valve member operable to engage said valve seat.

15. An electric air pump, as defined in claim 14, further comprising:
an electric circuit for controlling said motor assembly and said solenoid, in which said motor and said solenoid may be simultaneously grounded to prevent current, generated during motor coastdown, from delaying valve closure.

16. An electric air pump, as defined in claim 12, wherein said silencer housing air inlet chamber comprises an inlet port chamber, integral with said silencer housing inlet port and having sound insulating means disposed therein, a filter chamber, interconnected with said inlet chamber and having a filter element disposed therein and oriented, with respect to the air flow, so as to induce radial flow through said element, and an induction port chamber, interconnected with said filter chamber and said impeller chamber inlet and having sound insulating means disposed therein.

17. An electric air pump, as defined in claim 12, wherein said silencer housing inlet and outlet ports are located on said first closed end of said housing.

18. An electric air pump, having a central mounting plate, an electric motor assembly integral with a first side of said plate, a silencer housing which cooperates with said first side of said mounting plate to enclose said motor assembly, an impeller housing secured to a second side of said plate, said motor assembly having an armature shaft that extends, through a central aperture in said mounting plate, into the working chamber defined between said mounting plate and said impeller housing to support and drive an impeller within said chamber to induce air flow through said chamber, said air pump further comprising:
lock recesses formed about the circumference of said mounting plate, said recesses having lock ramps formed integrally therein;
lock arms, corresponding in number and location to said lock recesses, extending outwardly from one of said impeller housing and said silencer housing configured to matingly engage said corresponding mounting plate lock ramps in a bayonet fashion to hold said mounting plate and said one of said impeller housing and said silencer housing in engagement therewith;
lock nibs, extending outwardly from the side of said one of said impeller housing and said silencer housing, and positioned axially from said lock recesses; and
lock tabs, extending axially outwardly from the other of said impeller housing and said silencer housing, said tabs having recesses formed on the inner sides thereof for engagement with said lock nibs, said tabs extendible through said locking recesses, adjacent said lock arms engaged in said lock recesses, to thereby hold said lock arms in engagement therewith and to retain said housing, said mounting plate, and said silencer housing in an axially fixed relationship.

19. An electric air pump, having an impeller housing, drive means having an armature shaft that extends into the working chamber of said impeller housing, to support and drive an impeller within said chamber to induce air flow through said chamber, from an inlet to an outlet, said impeller comprising a central hub portion and an outer blade portion, said central hub portion having a series of elongated arcuate recesses formed therein;
wherein air trapped within said recesses forms a dynamic air seal between said central hub portion and the opposing wall of said working chamber as said impeller hub rotates relative to said chamber, thereby reducing air leakage between the inlet and the outlet side of said working chamber.

20. An air pump, as defined in claim 19, further comprising arcuate recesses formed in the wall of said working chamber opposing said recesses formed in said central hub portion, which act in concert with said recesses in said impeller hub to form a dynamic air seal between said surfaces.

21. An air pump, as defined in claim 19, wherein said impeller housing is constructed of a polymeric material having a portion of said impeller chamber formed integrally therein and having a pilot aperture molded therein for supporting the impeller end of said motor armature shaft to thereby position said shaft and said impeller relative to said impeller chamber.

22. An air pump, as defined in claim 21, wherein said pilot aperture comprises radially inwardly extending webs whose end portions cooperate to form a supporting bearing surface for said armature shaft, said surface subject to wear in cases of misalignment between said armature shaft and said impeller housing thereby providing for a self-seating bearing surface.

* * * * *